United States Patent
Kim

(10) Patent No.: US 10,573,918 B2
(45) Date of Patent: Feb. 25, 2020

(54) RECHARGEABLE BATTERY INCLUDING PROTRUSION AND DEPRESSION WITH RESILIENT SUPPORT AND BATTERY MODULE INCLUDING THE SAME

(71) Applicant: SAMSUNG ELECTRONICS CO., LTD., Suwon-si (KR)

(72) Inventor: Myunghoon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 149 days.

(21) Appl. No.: 15/646,339

(22) Filed: Jul. 11, 2017

(65) Prior Publication Data

US 2018/0175432 A1 Jun. 21, 2018

(30) Foreign Application Priority Data

Dec. 21, 2016 (KR) .................. 10-2016-0175551

(51) Int. Cl.
| | | |
|---|---|---|
| *H01M 10/04* | (2006.01) | |
| *H01M 2/26* | (2006.01) | |
| *H01M 2/02* | (2006.01) | |
| *H01M 10/613* | (2014.01) | |

(52) U.S. Cl.
CPC ....... *H01M 10/0413* (2013.01); *H01M 2/266* (2013.01); *H01M 2/0207* (2013.01); *H01M 10/613* (2015.04)

(58) Field of Classification Search
CPC ........ H01M 2/202; H01M 2/266; H01M 2/30; H01M 10/0413
USPC .................. 429/149, 156, 158, 159, 160
See application file for complete search history.

(56) References Cited

U.S. PATENT DOCUMENTS

| | | | |
|---|---|---|---|
| 5,496,657 A * | 3/1996 | Dixon, Jr. ............. | H01M 2/206 429/1 |
| 5,663,012 A * | 9/1997 | Shannon ............... | H01M 2/206 429/121 |
| 7,887,952 B2 | 2/2011 | Kim | |
| 8,173,288 B2 | 5/2012 | Cheon et al. | |
| 8,465,867 B2 | 6/2013 | Kim | |
| 8,519,674 B2 | 8/2013 | Anderson et al. | |
| 8,906,543 B2 | 12/2014 | Kim | |
| 2003/0054240 A1* | 3/2003 | Aronsson ............ | H01M 2/1077 429/157 |
| 2010/0173178 A1* | 7/2010 | Kim ........................ | H01M 2/06 429/1 |
| 2011/0151316 A1* | 6/2011 | Yoon ................... | H01M 2/1077 429/160 |

(Continued)

FOREIGN PATENT DOCUMENTS

| | | |
|---|---|---|
| JP | 5013666 | 8/2012 |
| JP | 2012178271 A * | 9/2012 |

(Continued)

*Primary Examiner* — Sean P Cullen
(74) *Attorney, Agent, or Firm* — NSIP Law

(57) ABSTRACT

A rechargeable battery includes a body including an electrolyte, the body configured to be charged and discharged; a protrusion protruding from the body and having a polarity corresponding to a positive electrode or a negative electrode; a depression recessed toward an inside of the body and having an opposite polarity to the polarity of the protrusion; and a resiliently deformable support disposed in either one or both of the inside of the depression and the outside of the protrusion.

17 Claims, 13 Drawing Sheets

(56) References Cited

U.S. PATENT DOCUMENTS

2011/0302773 A1* 12/2011 Chattot ............... H01M 2/1077
                                                                                 29/729
2016/0061908 A1    3/2016  Torai et al.

FOREIGN PATENT DOCUMENTS

| KR | 10-1017911 B1 | 3/2011 |
| KR | 10-1040975 B1 | 6/2011 |
| KR | 10-1042750 B1 | 6/2011 |
| KR | 10-2012-0016353 A | 2/2012 |
| KR | 10-2012-0118933 A | 10/2012 |
| KR | 10-1219232 B1 | 1/2013 |
| KR | 10-1364595 B1 | 2/2014 |
| KR | 10-1420827 B1 | 7/2014 |

* cited by examiner

612

613

RECHARGEABLE BATTERY INCLUDING PROTRUSION AND DEPRESSION WITH RESILIENT SUPPORT AND BATTERY MODULE INCLUDING THE SAME

CROSS-REFERENCE TO RELATED APPLICATION

This application claims the benefit under 35 USC § 119(a) of Korean Patent Application No. 10-2016-0175551 filed on Dec. 21, 2016, in the Korean Intellectual Property Office, the entire disclosure of which is incorporated herein by reference for all purposes.

BACKGROUND

1. Field

The following description relates to a rechargeable battery and a battery module including the same.

2. Description of Related Art

A rechargeable battery is a type of battery that may supply power to an external circuit by converting chemical energy into electrical energy or store electricity by receiving external power and converting electrical energy into chemical energy. A structure and process of connecting electrode tabs of rechargeable batteries is being developed for recyclability and easy assembly, amongst other beneficial features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rechargeable battery, includes a body including an electrolyte, the body configured to be charged and discharged; a protrusion protruding from the body and having a polarity corresponding to a positive electrode or a negative electrode; a depression recessed toward an inside of the body and having an opposite polarity to the polarity of the protrusion; and a resiliently deformable support disposed in either one or both of the inside of the depression and the outside of the protrusion.

The support may include a housing configured to be inserted into the depression; and a supporting member disposed on an inner wall of the housing.

The supporting member may be provided on the inner wall of the housing in a longitudinal direction of the housing.

The supporting member may be provided on the inner wall of the housing along a circumference of the housing.

The support may further include an elastic member disposed inside of the housing and connected to a terminal end of the depression.

The support may further include an insulating member disposed at at least one end of the housing.

A diameter of the insulating member may be greater than a diameter of the supporting member.

A diameter of the protrusion may be greater than or equal to an inner diameter of the supporting member.

A length of the protrusion may be less than or equal to a depth of the depression.

According to another general aspect, a battery module includes a first rechargeable battery that includes a first cell body, a protrusion protruding from the first cell body and having a polarity corresponding to a positive electrode or a negative electrode, and a second rechargeable battery that includes a second cell body, a depression recessed toward an inside of the second cell body and having an opposite polarity to the polarity of the protrusion, and a resiliently deformable support disposed on either one or both of an inner wall of the depression and an outer wall of the protrusion.

The battery module may further include a connector configured to electrically couple the first rechargeable battery and the second rechargeable battery.

The connector may include a longitudinal bar; a first connecting portion protruding from one side of the bar and supported by the support; and a second connecting portion recessed on another side of the bar toward an inside of the bar and configured to support the protrusion.

The second connecting portion may include a recess into which the protrusion is inserted; and a supporter disposed on an inner wall of the recess and configured to support the protrusion.

The second connecting portion may further include an elastic element disposed inside of the recess and connected to the protrusion.

The connector may include a longitudinal bar; a first connecting portion protruding from one side of the bar and supported by the support; and a second connecting portion protruding from another side of the bar and configured to be supported by the support.

The connector may include a longitudinal bar; a first connecting portion recessed on one side of the bar toward an inside of the bar and configured to support the protrusion; and a second connecting portion recessed on another side of the bar toward the inside of the bar and configured to support the protrusion.

The battery module may further include a cooler disposed adjacent to the connector and configured to remove heat generated by the connector.

The battery module may further include a holder configured to attach and detach the second rechargeable battery to and from the first rechargeable battery.

The battery module may further include a sensor configured to measure at least one of a potential difference of the first rechargeable battery and a potential difference of the second rechargeable battery.

The resiliently deformable support may be configured to mechanically and electrically couple with an adjacent rechargeable battery without welding.

Other features and aspects will be apparent from the following detailed description, the drawings, and the claims.

Figure 1:
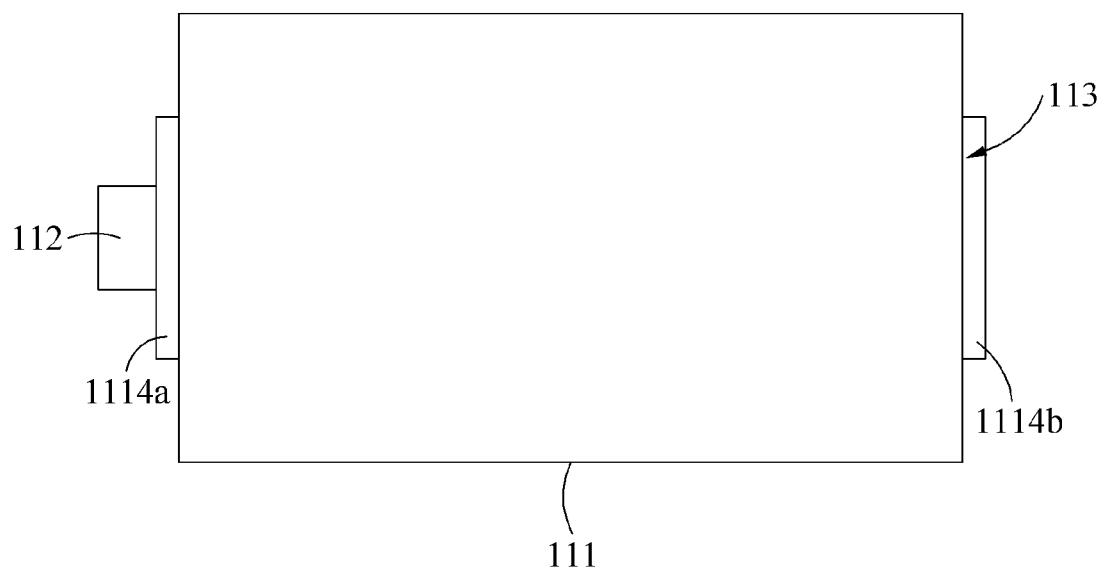
FIG. 1 is a side view illustrating a rechargeable battery in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art after gaining a thorough understanding of the disclosure of this application. For example, the sequences of operations described herein are merely examples, and are not limited to those set forth herein, but may be changed as will be apparent to one of ordinary skill in the art after gaining such understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component is not present therebetween. Likewise, expressions, for example, "between" and "immediately between" and "adjacent to" and "immediately adjacent to" are also to be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
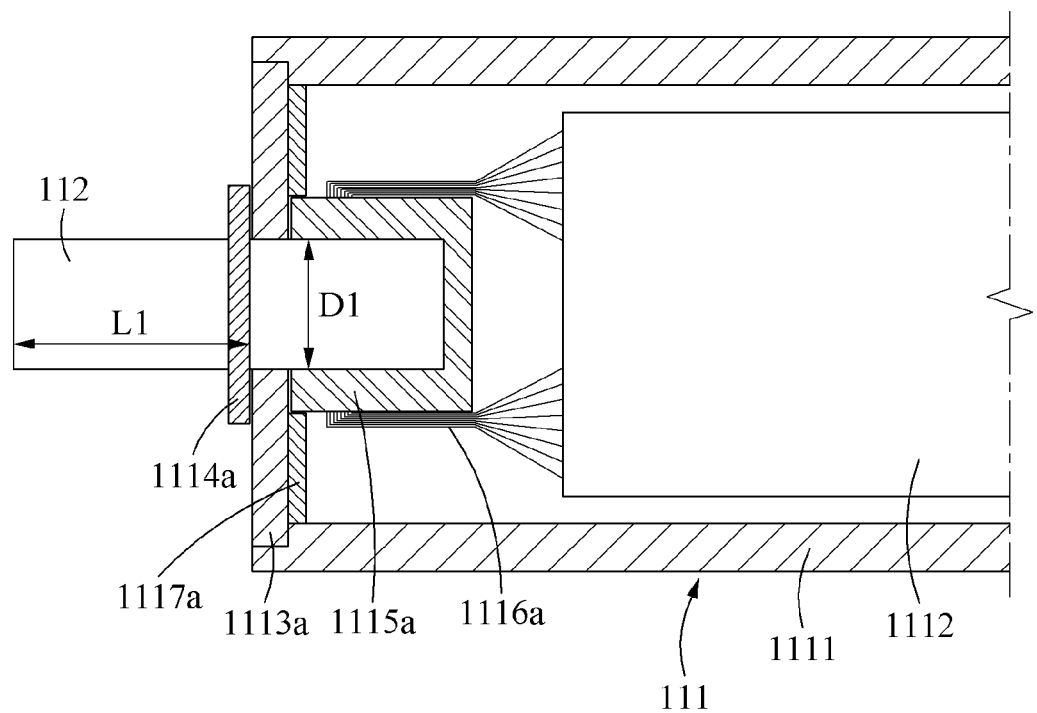
FIG. 2 is a cross-sectional view illustrating a portion of a rechargeable battery in accordance with an embodiment.
Figure 3:
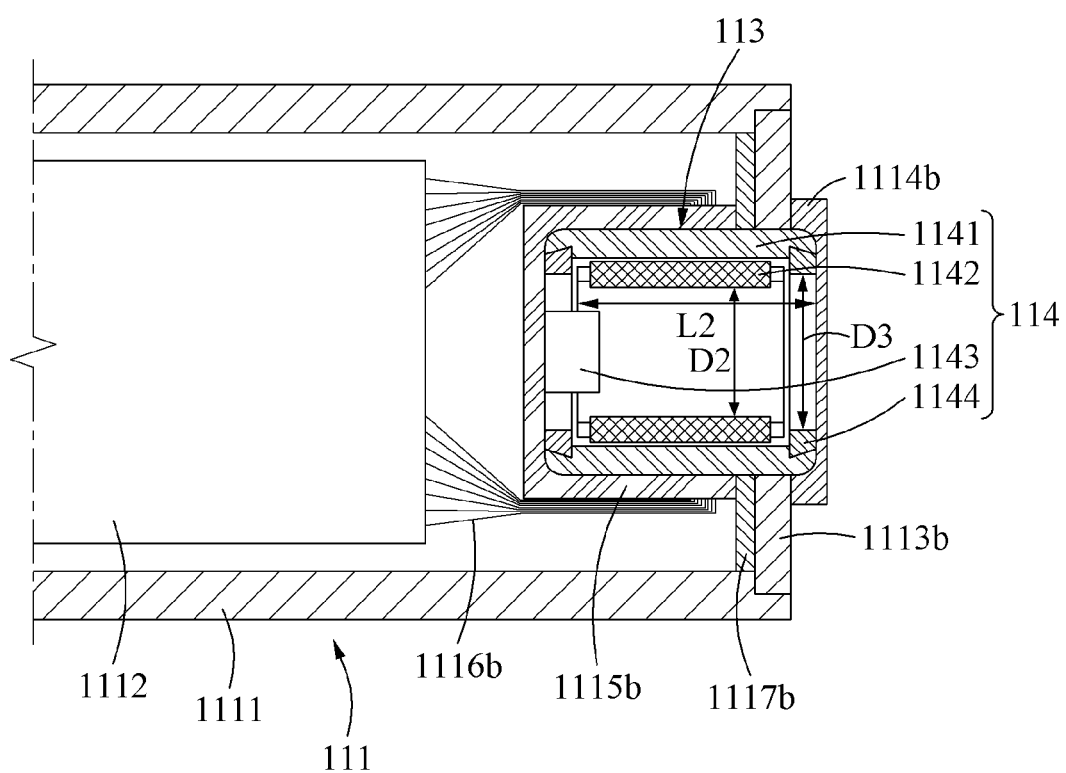
FIG. 3 is a cross-sectional view illustrating a portion of a rechargeable battery in accordance with an embodiment.
Figure 4:
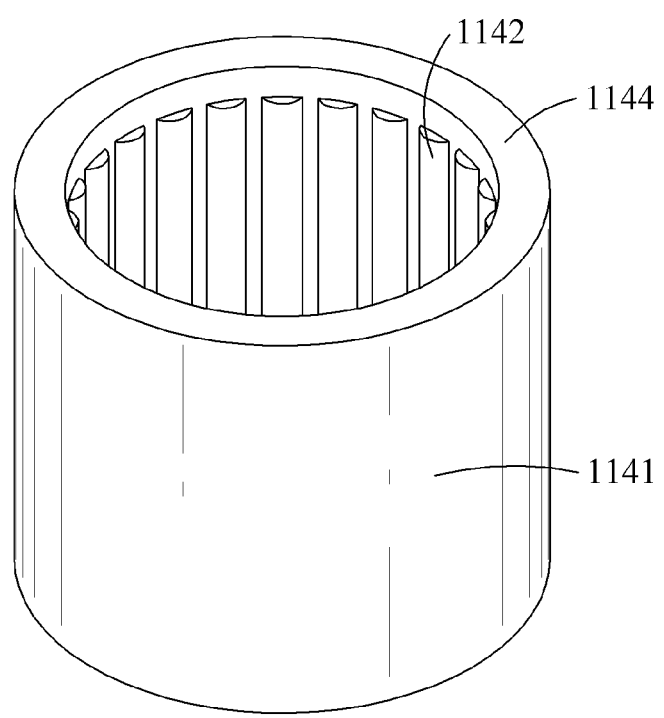
FIG. 4 is a perspective view illustrating a support in accordance with an embodiment.

FIG. 1 is a side view illustrating a rechargeable battery in accordance with an embodiment, FIG. 2 is a cross-sectional view illustrating a portion of the rechargeable battery in accordance with an embodiment, FIG. 3 is a cross-sectional view illustrating a portion of the rechargeable battery in accordance with an embodiment, and FIG. 4 is a perspective view illustrating a support in accordance with an embodiment.

Referring to FIGS. 1 through 4, a rechargeable battery 11 is included in transportation device such as a vehicle to supply electric energy to the transportation device such as a car, bicycle, motorcycle, scooter, personal transportation device, long board, or other electrically powered transportation device. The rechargeable battery 11 includes a body 111, a protrusion 112, a depression 113, and a support 114.

The body 111 to be charged and discharged includes an electrolyte. The body 111 includes a can 1111 that forms an exterior of the body 111, a jelly roll-shaped electrode assembly 1112 including a positive electrode, a negative electrode, and a separator that performs an insulating function, at least one can plate 1113a, 1113b provided at both ends of the can 1111, at least one top plate 1114a, 1114b provided on the at least one can plate 1113a, 1113b, at least one current collector 1115a, 1115b provided on the at least one can plate 1113a, 1113b such that the at least one current collector 1115a, 1115b and the at least one top plate 1114a, 1114b are disposed on opposite sides of the at least one can plate 1113a, 1113b, at least one connecting member 1116a, 1116b connecting the at least one current collector 1115a, 1115b and the electrode assembly 1112, and at least one insulator 1117a, 1117b that prevents a contact between the can 1111 and the at least one current collector 1115a, 1115b.

The protrusion 112 is connected to the positive electrode or the negative electrode and has a polarity corresponding to the positive electrode or the negative electrode. The protrusion 112 protrudes from the body 111. The top plate 1114a is disposed along a circumference of the protrusion 112. For example, the protrusion 112 includes a rod-shaped rivet.

The depression 113 is connected to the positive electrode or the negative electrode and has a polarity corresponding to the positive electrode or the negative electrode, the polarity opposite to the polarity of the protrusion 112. For example, when the polarity of the protrusion 112 corresponds to the positive electrode, the polarity of the depression 113 corresponds to the negative electrode. The depression 113 is recessed toward an inside of the body 111.

In a case in which adjacent rechargeable batteries are electrically connected in series or parallel by welding, at least one of the adjacent rechargeable batteries may be defective. When detaching the defective rechargeable battery, positive electrodes and/or negative electrodes of the rechargeable batteries may be damaged. In this example, both the defective rechargeable battery and the defect-free rechargeable battery may need to be discarded. However, in the structure of FIG. 1 as described above, the rechargeable battery 11 is electrically connected to another rechargeable battery by fit rather than welding. Thus, although one of the adjacent rechargeable batteries is defective, the defective rechargeable battery may be easily separated, whereby a cost for discarding the rechargeable battery may be reduced. Further, when manufacturing a battery module, a process of connecting or separating adjacent rechargeable batteries to or from each other may be more easily performed.

A length L1 of the protrusion 112 is less than or equal to a depth L2 of the depression 113. In the above structure, when manufacturing a battery module by connecting adjacent rechargeable batteries, a gap between the adjacent rechargeable batteries may be minimized, and thus a space efficiency between the adjacent rechargeable batteries may be achieved.

The support 114 is disposed inside of the depression 113. When a protrusion of an adjacent rechargeable battery is inserted into the depression 113 of the rechargeable battery 11, the support 114 supports a protrusion of the adjacent rechargeable battery. The support 114 includes a housing 1141 to be inserted into the depression 113, a supporting member 1142, an elastic member 1143, and an insulating member 1144.

When the protrusion of the adjacent rechargeable battery is inserted into the depression 113, the supporting member 1142 supports the protrusion of the adjacent rechargeable battery. In this example, an inner wall of the supporting member to be in contact with an outer wall of the protrusion of the adjacent rechargeable battery includes a conductive material. The supporting member 1142 is disposed on an inner wall of the housing 1141 or, in one or more embodiments, is disposed on the protrusion 112. For example, the supporting member 1142 is a substantially toroidal or cylindrical shape and includes circumferentially disposed elements such as one or more rolling bearings, e.g. ball bearings, a roll bearings, or a needle bearings. In the above structure, when the protrusion of the adjacent rechargeable battery is inserted into the depression 113, the supporting member 1142 may prevent an inadvertent separation of the protrusion of the adjacent rechargeable battery from the depression 113, whereby the adjacent rechargeable batteries may be stably connected.

When the protrusion of the adjacent rechargeable battery is coupled to the depression 113, a gap is formed between the inner wall of the housing 1141 and the depression 113. That is, when the protrusion of the adjacent rechargeable battery is coupled to the depression 113, the inner wall of the supporting member 1142 is in contact with the outer wall of the protrusion of the adjacent rechargeable battery and moves radially with respect to the depression 113. Thus, either one or both of the protrusion 112 or depression 113 are provided with a resiliently deformable supporting member to substantially maximize electrical and mechanical coupling between adjacent rechargeable batteries while allowing for modular removal/replacement of individual cells. For example, the depression 113 includes a spring that is connected to each of the supporting member 1142 elements and the depression 113 and moves elastically with respect to the depression 113. Also, when the protrusion of the adjacent rechargeable battery is coupled to the depression 113, an increased gap is formed between elements of the supporting member 1142 by the protrusion of the adjacent rechargeable battery. For example, an elastic element such as a spring is provided between the adjacent elements of the supporting member 1142. In the above structure, the protrusion of the adjacent rechargeable battery is stably coupled to the depression 113 irrespective of an error in a diameter of the protrusion occurring in a process of manufacturing the protrusion of the adjacent rechargeable battery.

The supporting member 1142 is formed on the inner wall of the housing 1141 in a longitudinal direction of the housing 1141. In the above structure, the inner wall of the supporting member 1142 and the outer wall of the protrusion of the adjacent rechargeable battery are in contact. In this example, due to the biasing force, a contact area between the inner wall of the supporting member 1142 and the outer wall of the protrusion of the adjacent rechargeable battery increases, and a contact resistance therebetween decreases. Thus, heat generated between the depression 113 and the protrusion of the adjacent rechargeable battery is reduced.

The supporting member 1142 is formed on the inner wall of the housing along a circumference of the housing 1141. In the above structure, when the protrusion of the adjacent rechargeable battery is in contact with an inner wall of the supporting member 1142, a substantially uniform force may be applied radially and thus, the adjacent rechargeable batteries are stably connected.

A diameter D1 of the protrusion 112 is greater than or equal to a biased inner diameter D2 of the supporting member 1142. In the above structure, when the protrusion of the adjacent rechargeable battery is inserted into and coupled to the depression 113, the supporting member 1142 and the protrusion of the adjacent rechargeable battery may be stably in contact with each other.

The elastic member 1143 is disposed inside of the housing 1141. When the protrusion of the adjacent rechargeable battery is coupled to the depression 113, the elastic member 1143 is connected to one end of the protrusion of the adjacent rechargeable battery to elastically support the protrusion of the adjacent rechargeable battery. For example, the elastic member 1143 is a spring. In the above structure, when the protrusion of the adjacent rechargeable battery is coupled to the depression 113, the depression 113 and the protrusion of the adjacent rechargeable battery may be firmly coupled although an external oscillation or impact is applied to the rechargeable battery 11. That is, in a case in which the rechargeable battery 11 is used for transportation, a connection between the adjacent rechargeable batteries may be stably maintained although an external force applied to the transportation device is transmitted to the rechargeable battery 11.

The insulating member 1144 encloses at least a portion of the supporting member 1142, and maintains an electrical connection between the supporting member 1142 and the protrusion of the adjacent rechargeable battery. The insulating member 1144 is disposed on one end or both ends of the housing 1141. For example, the insulating member 1144 includes a non-conductive material. In the above structure, in a process of manufacturing a battery module or a process of separating a rechargeable battery from a battery module or assembling a rechargeable battery together with the battery module, sparks to be generated when at least a portion of the supporting member 1142 is in contact with a conductive material other than the protrusion of the adjacent rechargeable battery may be prevented in advance.

According to one or more embodiments, an inner diameter D3 of the insulating member 1144 is greater than the inner diameter D2 of the supporting member 1142. In the above structure, the contact area between the inner wall of the supporting member 1142 and the outer wall of the protrusion of the adjacent rechargeable battery may be maintained. Further, in a case in which a gap is formed between the supporting member 1142 and the protrusion of the adjacent rechargeable battery, sparks to be generated when the protrusion of the adjacent rechargeable battery including a conductive material is in contact with the rechargeable battery 11 or another constituent of the battery module may be prevented.

Figure 5:
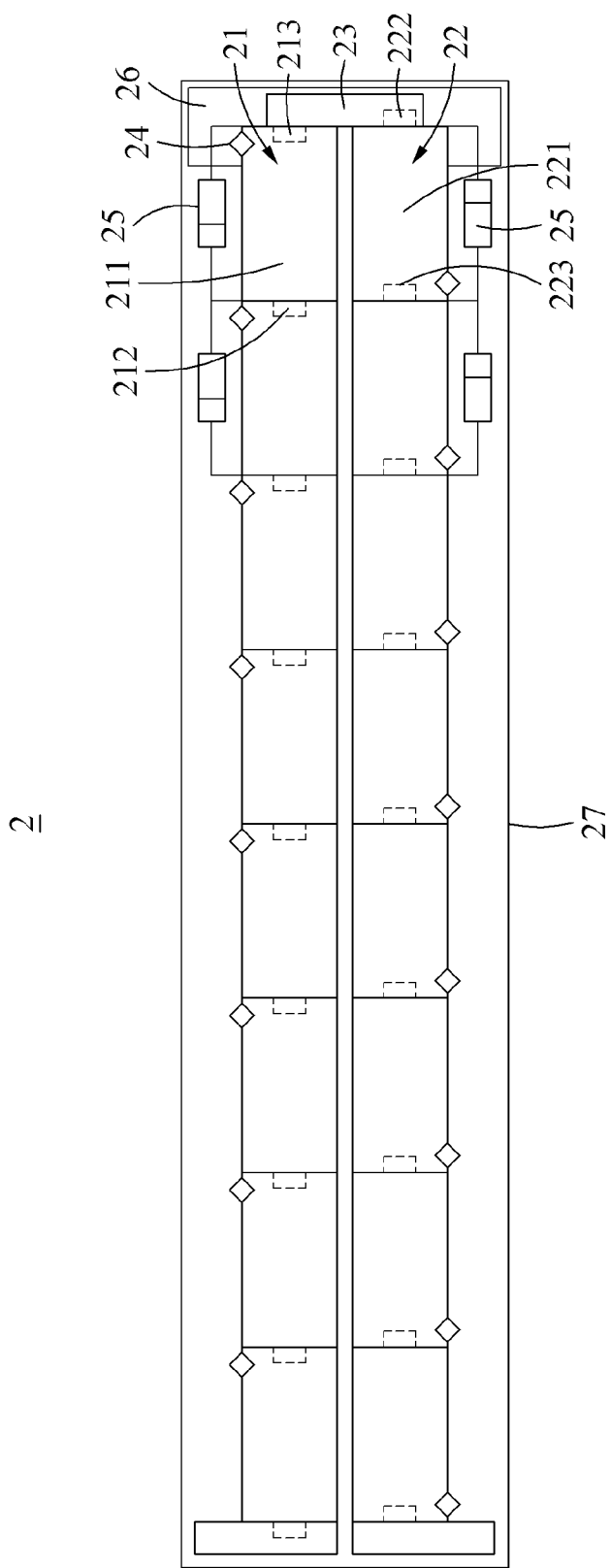
FIG. 5 illustrates a battery module in accordance with an embodiment.
Figure 6:
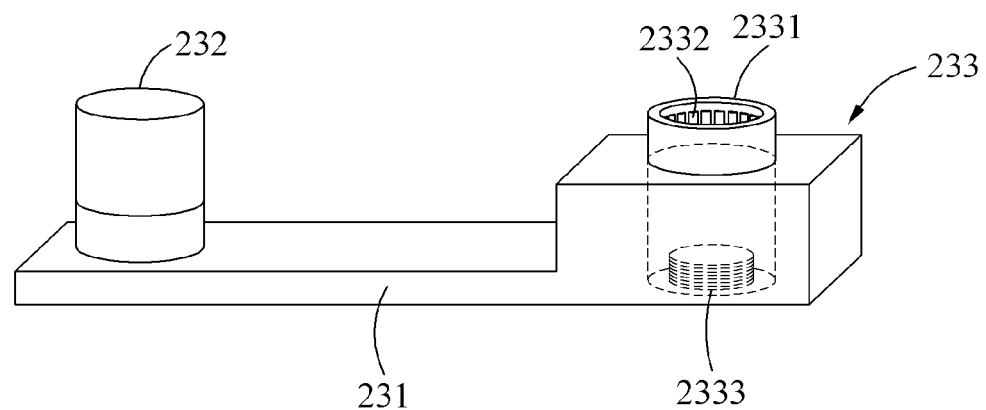
FIG. 6 is a perspective view illustrating a connector in accordance with an embodiment.

FIG. 5 illustrates a battery module in accordance with an embodiment, and FIG. 6 is a perspective view illustrating a connector in accordance with an embodiment.

Referring to FIGS. 5 and 6, a battery module 2 includes a first rechargeable battery 21, a second rechargeable battery 22, a connector 23, a holder 24, a sensor 25, a cooler 26, and a case 27. The first rechargeable battery 21 includes a first body 211, a first protrusion 212, a first depression 213, and a first support, and the second rechargeable battery 22 includes a second body 221, a second protrusion 222, a second depression 223, and a second support.

The connector 23 electrically couples the first rechargeable battery 21 and the second rechargeable battery 22. In the above structure, a series connection or parallel connection between the first rechargeable battery 21 and the second rechargeable battery 22 that are adjacent to each other may be implemented.

The connector 23 includes a longitudinal bar 231, a first connecting portion 232 provided on one side of the bar 231, and a second connecting portion 233 provided on another side of the bar 231 to be spaced apart from the first connecting portion 232.

The bar 231 includes a conductive material, and electrically connects the first rechargeable battery 21 and the second rechargeable battery 22.

The first connecting portion 232 includes a shape to be coupled to the first depression 213. For example, the first connecting portion 232 is a rod that protrudes from the one side of the bar 231 and is in contact with an inner wall of the first depression 213 or an inner wall of a supporting member.

The second connecting portion 233 includes a shape to be coupled to the second protrusion 222. For example, the second connecting portion 233 includes a recess 2331 into which the second protrusion 222 is to be inserted, and a supporter 2332 disposed on an inner wall of the recess 2331 to elastically support the second protrusion 222. Here, the recess 2331 and the supporter 2332 correspond to the housing 1141 of the support 114 of FIG. 3 and the supporting member 1142 of FIG. 3, respectively, as described with reference to FIGS. 1 through 4. In the above structure, a series connection between the first rechargeable battery 21 and the second rechargeable battery 22 may be implemented. Further, the first rechargeable battery 21 and the second rechargeable battery 22 may be electrically coupled without need of a separate welding process, whereby a process of the battery module 2 may be simplified and safely performed. In addition, a waste of cost and space for welding may decrease, and an energy density per volume of the battery module 2 may increase.

The second connecting portion 233 is disposed inside of the recess 2331. The second connecting portion 233 further includes an elastic element 2333 to be connected to the second protrusion 222. Here, the elastic element 2333 corresponds to the elastic member 1143 of the support 114 of FIG. 3, as described with reference to FIGS. 1 through 4. In the above structure, when the connector 23 is connected to each of the first rechargeable battery 21 and the second rechargeable battery 22, the connector 23 firmly connects the first rechargeable battery 21 and the second rechargeable battery 22 even though external forces may be applied to the battery module 2.

The holder 24 attaches and detaches the second rechargeable battery 22 to and from the first rechargeable battery 21. For example, the holder 24 is a fixing clip that facilitates the attachment and detachment between the first rechargeable battery 21 and the second rechargeable battery 22. Further, the holder 24 attaches and detaches each of the first rechargeable battery 21 and the second rechargeable battery 22 to and from the battery module 2, in addition to the attachment and detachment between the first rechargeable battery 21 and the second rechargeable battery 22. In the above structure, although an external force is applied to the battery module 2, the holder 24 may stably maintain the connection between the first rechargeable battery 21 and the second rechargeable battery 22. Since the attachment and detachment between the first rechargeable battery 21 and the second rechargeable battery 22 is easily performed, the battery module 2 may be easily assembled or disassembled.

The sensor 25 measures a potential difference of each of the first rechargeable battery 21 and/or the second rechargeable battery 22. For example, the sensor 25 measures a potential difference between the first protrusion 212 and the first depression 213 and/or measures a potential difference between the second protrusion 222 and the second depression 223. In the above structure, a user may easily detect a defective rechargeable battery through the sensor 25 in the battery module 2.

The cooler 26 is disposed adjacent to the connector 23 to remove heat generated by (or transmitted through) the connector 23. For example, the cooler 26 is a flow path disposed on the connector 23, the flow path through which a heat transfer fluid flows. In the above structure, heat generated by an electrical connection between the first rechargeable battery 21 and the second rechargeable battery 22 may be effectively removed.

The case 27 receives the first rechargeable battery 21 and the second rechargeable battery 22. Further, the holder 24 is provided on and along an inner wall of the case 27. In the above structure, the first rechargeable battery 21 and the second rechargeable battery 22 are stably connected.

Figure 7:
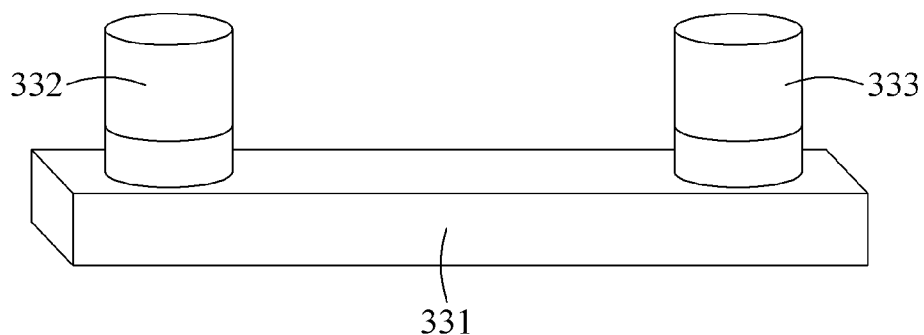
FIG. 7 is a perspective view illustrating a connector in accordance with an embodiment.

FIG. 7 is a perspective view illustrating a connector in accordance with an embodiment.

Referring to FIG. 7, a connector 33 includes a bar 331, a first connecting portion 332 protruding from one side of the bar 331 and including a shape to be coupled to the first depression 213 of FIG. 5, and a second connecting portion 333 protruding from another side of the bar 331 and including a shape to be coupled to the second depression 223 of FIG. 5. That is, the first connecting portion 332 protrudes from the one side of the bar 331 and is supported by a first support, and the second connecting portion 333 protrudes from the other side of the bar 331 is supported by a second support. In the above structure, a parallel connection between the first rechargeable battery 21 of FIG. 5 and the second rechargeable battery 22 of FIG. 5 may be implemented.

Figure 8:
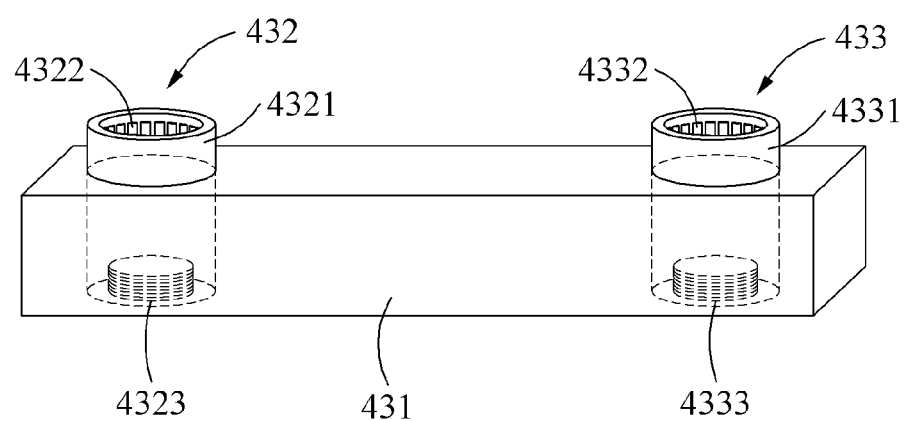
FIG. 8 is a perspective view illustrating a connector in accordance with an embodiment.

FIG. 8 is a perspective view illustrating a connector in accordance with an embodiment.

Referring to FIG. 8, a connector 43 includes a longitudinal bar 431, a first connecting portion 432, and a second connecting portion 433. The first connecting portion includes a first recess 4321 recessed toward an inside of the bar 431 on one side of the bar 431, the first recess 4321 into which a protrusion of an adjacent rechargeable battery is to be inserted, a first supporter 4322 disposed on an inner wall of the first recess 4321 to elastically support the protrusion of the adjacent rechargeable battery, and a first elastic element 4323 disposed inside of the first recess 4321 to elastically support the protrusion of the adjacent rechargeable battery. The second connecting portion 433 includes a second recess 4331 recessed toward the inside of the bar 431 on another side of the bar 431, the second recess 4331 into which the protrusion of another adjacent rechargeable battery is to be inserted, a second supporter 4332 disposed on an inner wall of the second recess 4331 to elastically support the protrusion of the other adjacent rechargeable battery, and a second elastic element 4333 disposed inside of the second recess 4331 to elastically support the protrusion of the other adjacent rechargeable battery. In the above structure, a parallel connection between the adjacent rechargeable batteries may be implemented.

Figure 9:
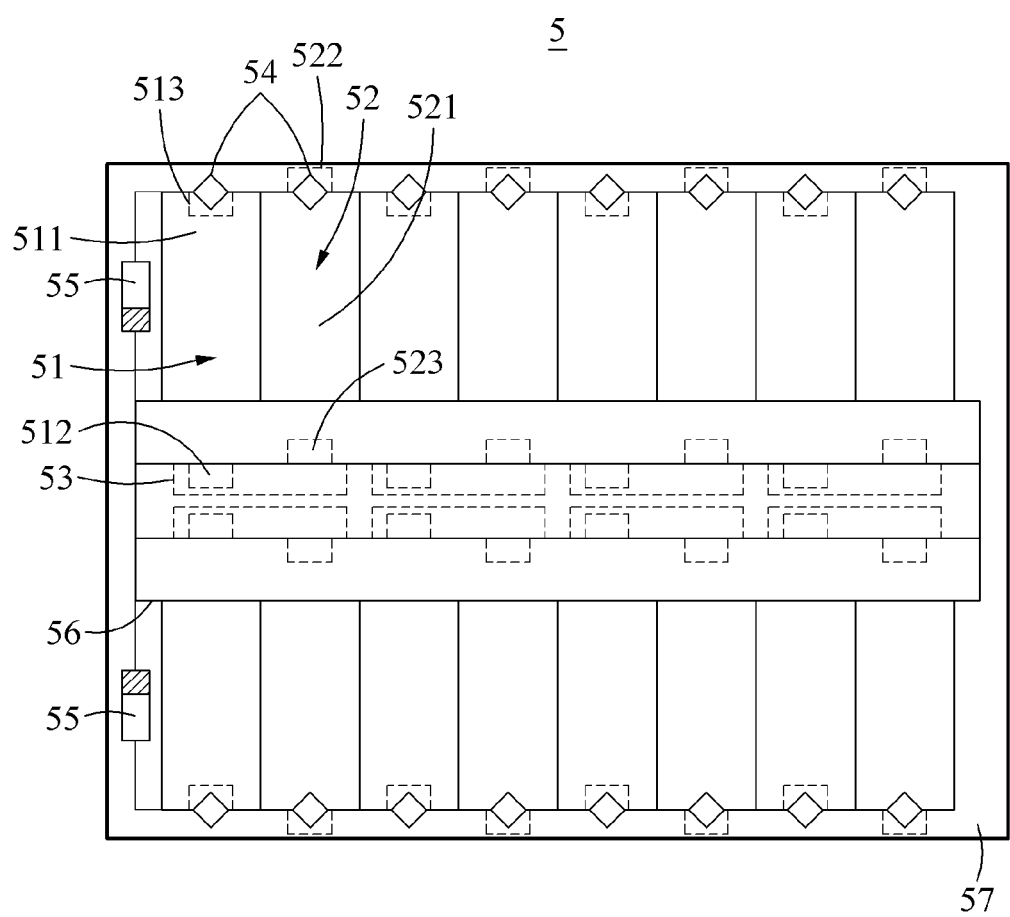
FIG. 9 illustrates a battery module in accordance with an embodiment.

FIG. 9 illustrates a battery module in accordance with an embodiment.

Referring to FIG. 9, a battery module 5 includes a first rechargeable battery 51 including a first body 511 that includes an electrolyte, the first body 511 to be charged and discharged, a first protrusion 512 protruding from the first body 511 and having a polarity corresponding to a positive electrode or a negative electrode, and a first depression 513 recessed toward an inside of the first body 511 and having an opposite polarity to the first protrusion 512, and a second rechargeable battery 52 including a second body 521 that includes an electrolyte, the second body 521 to be charged and discharged, a second protrusion 522 protruding from the second body 521 and having a polarity corresponding to a positive electrode or a negative electrode, and a second depression 523 recessed toward an inside of the second body 521 and having an opposite polarity to the second protrusion 522.

The battery module 5 further includes a connector 53 that electrically couples the first rechargeable battery 51 and the second rechargeable battery 52. In this example, the connector 53 is disposed in a middle portion of the battery module 5. A plurality of connectors 53 are disposed in a row such that sides of the first rechargeable battery 51 and the second rechargeable battery 52 are in contact with each other on both sides of the middle portion of the battery module 5.

The battery module 5 further includes a holder 54, a sensor 55, a cooler 56 (such as a phase-change heat pipe, spreader, or other suitable heat dispersion), and a case 57. The holder 54 is provided on an inner wall of the case 57 to attach each of the first rechargeable battery 51 and the second rechargeable battery 52 to the case 57. The sensor 55 is connected to both end portions of the first rechargeable battery 51 and/or the second rechargeable battery 52 to measure a potential difference of the first rechargeable battery 51 and/or the second rechargeable battery 52. The cooler 56 is disposed on the connector 53 to remove heat generated by the connector 53.

Figure 10:
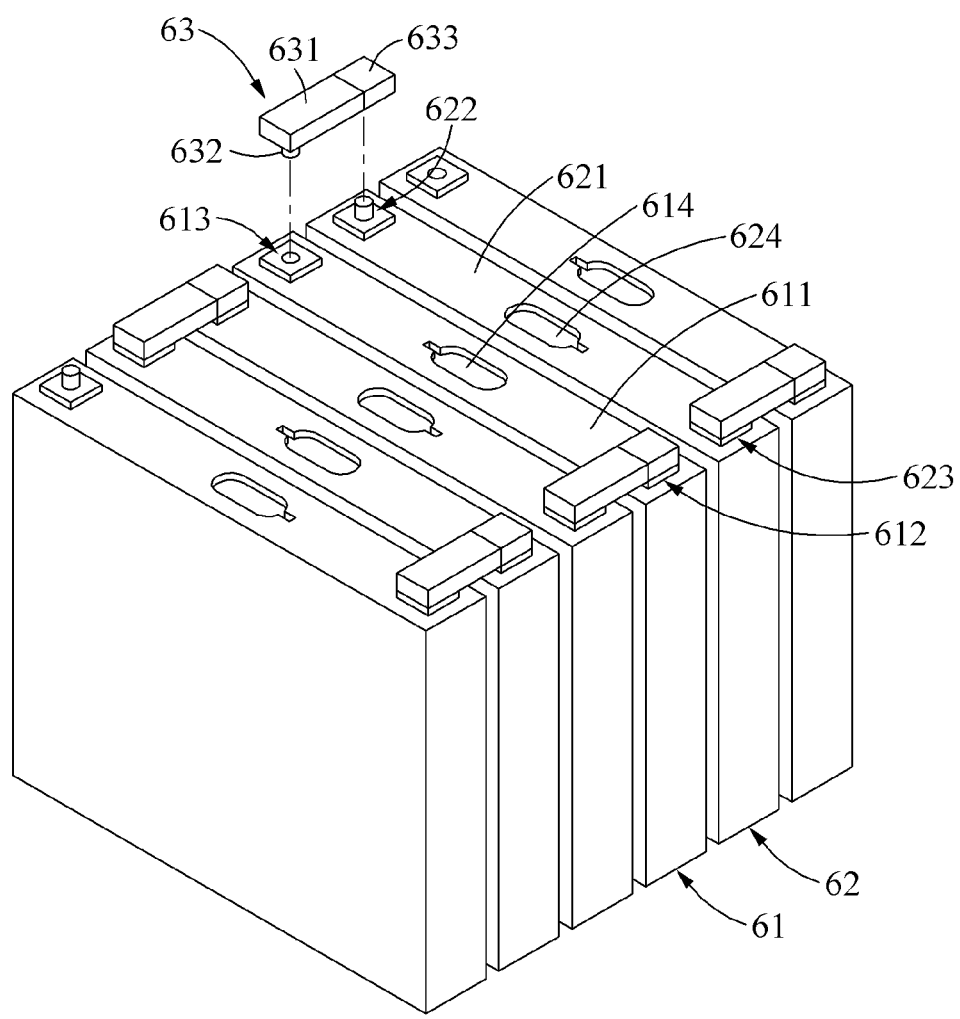
FIG. 10 is a perspective view illustrating a battery module in accordance with an embodiment.
Figure 11:
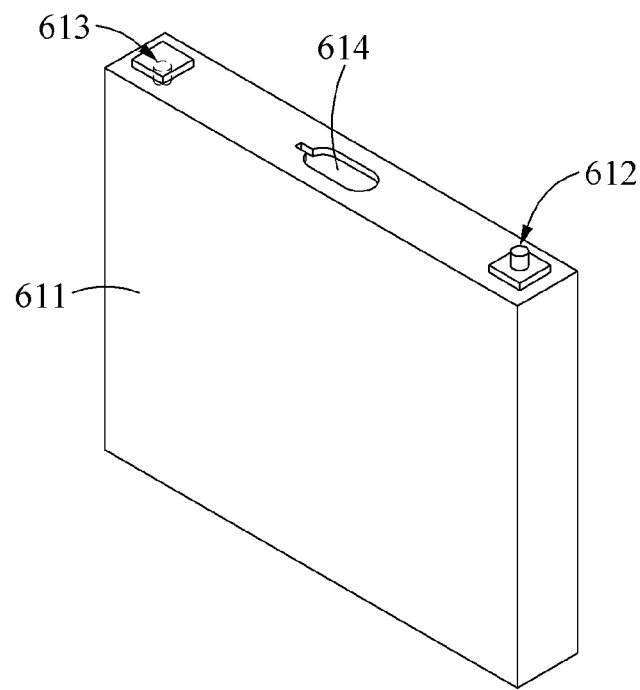
FIG. 11 is a perspective view illustrating a rechargeable battery in accordance with an embodiment.
Figure 12:
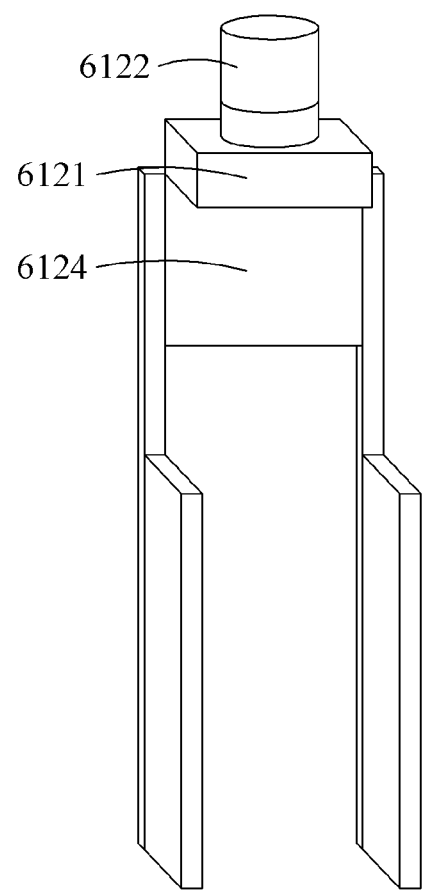
FIG. 12 is a perspective view illustrating a protrusion in accordance with an embodiment.
Figure 13:
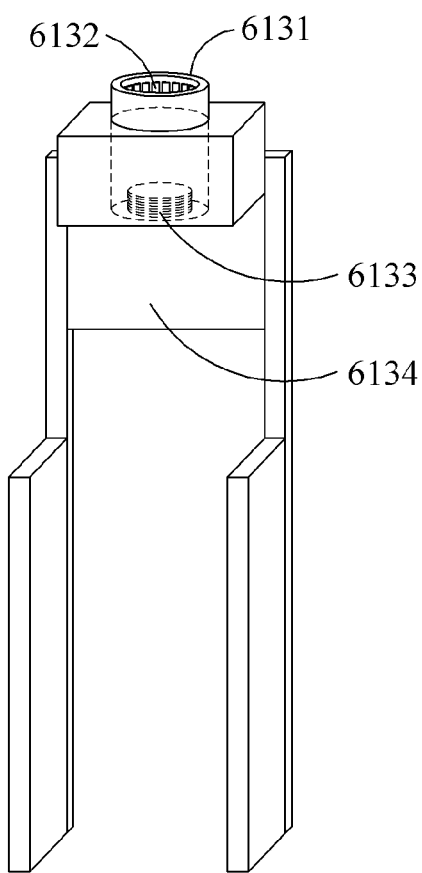
FIG. 13 is a perspective view illustrating a depression in accordance with an embodiment.

FIG. 10 is a perspective view illustrating a battery module in accordance with an embodiment, FIG. 11 is a perspective view illustrating an example of a rechargeable battery in accordance with an embodiment, FIG. 12 is a perspective view illustrating an example of a protrusion in accordance with an embodiment, and FIG. 13 is a perspective view illustrating an example of a depression in accordance with an embodiment.

Referring to FIGS. 10 through 13, a battery module 6 includes: a first rechargeable battery 61 including a first body 611 having an e.g. prismatic structure, a first protrusion 612 provided protruding from the first body 611, a first depression 613 provided inside of the first body 611, and a first vent 614 through which gas generated from the first body 611 is discharged; a second rechargeable battery 62 including a second body 621 having an e.g. prismatic structure, a second protrusion 622, a second depression 623 provided inside of the second body 621, and a second vent 624 through which gas generated from the second body 621 is discharged; and a connector 63 including a bar 631 that electrically couples the first rechargeable battery 61 and the second rechargeable battery 62, a first connecting portion 632 protruding from one side of the bar 631 and having a shape to be coupled to the first depression 613, and a second connecting portion 633 recessed toward the inside of the bar 631 and having a shape to be coupled to the second protrusion 622.

The first protrusion 612 includes a first plate 6121 to be coupled to an upper side of the first body 611, a first protruding member 6122 protruding upward from the first plate 6121 and having a polarity corresponding to a positive electrode or a negative electrode, and a first current collector 6124 disposed on a lower side of the first plate 6121 to collect currents.

The first depression 613 includes a first recess 6131 having a recessed shape to be coupled to the upper side of the first body 611, the first recess 6131 into which the first connecting portion 632 is to be inserted, a first supporting member 6132 disposed on an inner wall of the first recess 6131 to support the first connecting portion 632, an elastic element 6133 provided inside of the first recess 6131 to elastically support the first connecting portion 632, and a second current collector 6134 disposed on a lower side of the first recess 6131 to collect currents.

In the above structure, when manufacturing the battery module 6, both a series connection and a parallel connection between the first rechargeable battery 61 and the second rechargeable battery 62 may be implemented by the connector 63. A cost is reduced because an additional process such as welding is not required. In a case in which a defect is detected in the first rechargeable battery 61 and/or the second rechargeable battery 62, the defective rechargeable battery is easily replaced and a cost for replacement is significantly reduced, especially in systems, such as transportation devices employing battery packs with large numbers of interconnected cells.

While this disclosure includes specific examples, it will be apparent, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A rechargeable battery, comprising:
a body comprising an electrolyte, the body configured to be charged and discharged;
a protrusion protruding from the body in a first direction and electrically connected to a first electrode of the body;

a depression recessed in a second direction opposing the first direction toward an inside of the body and electrically connected to a second electrode of the body having an opposite polarity to the polarity of the first electrode; and a resiliently deformable support disposed at an inside of the depression, wherein the support comprises:

a housing configured to be inserted into the depression; and a supporting member comprising beatings disposed on an inner wall of the housing in a longitudinal direction of the housing and along a circumference of the housing.

2. The rechargeable battery of claim 1, wherein a diameter of the protrusion is greater than or equal to an inner diameter of the supporting member.

3. The rechargeable battery of claim 1, wherein a length of the protrusion is less than or equal to a depth of the depression.

4. The rechargeable battery of claim 1, wherein the resiliently deformable support is configured to mechanically and electrically couple with an adjacent rechargeable battery without welding.

5. The rechargeable battery of claim 1, wherein the support further comprises:

an elastic member disposed inside of the housing and connected to a terminal end of the depression.

6. The rechargeable battery of claim 5, wherein the support further comprises:

an insulating member disposed at at least one end of the housing.

7. The rechargeable battery of claim 6, wherein a diameter of the insulating member is greater than a diameter of the supporting member.

8. A battery module, comprising:

a first rechargeable battery that comprises a first cell body, and a protrusion protruding from the first cell body and electrically connected to an electrode of the first cell body;

a second rechargeable battery that comprises a second cell body, a protrusion protruding from the second cell body and electrically connected to an electrode of the second cell body, and a depression recessed toward an inside of the second cell body and electrically connected to another electrode of the second cell body; and a resiliently deformable support disposed at an inner wall of the depression of the second battery; and a connector configured to fit with the protrusion of the first battery and either the protrusion or the depression of the second battery, wherein the support comprises:

a housing configured to be inserted into the depression of the second battery; and a supporting member comprising bearings disposed on an inner wall of the housing in a longitudinal direction of the housing and along a circumference of the housing.

9. The battery module of claim 8, further comprising:

a holder configured to attach and detach the second rechargeable battery to and from the first rechargeable battery.

10. The battery module of claim 8, further comprising:

a sensor configured to measure at least one of a potential difference of the first rechargeable battery and a potential difference of the second rechargeable battery.

11. The battery module of claim 8, wherein the connector is configured to electrically couple the first rechargeable battery and the second rechargeable battery.

12. The battery module of claim 11, further comprising:

a cooler disposed adjacent to the connector and configured to remove heat generated by the connector.

13. The battery module of claim 11, wherein the support is disposed on the inner wall of the depression of the second battery, the first battery further comprises another resiliently deformable support disposed on an inner wall of a depression recessed toward an inside of the first cell body, and the connector comprises:

a longitudinal bar; and a first connecting portion protruding from one side of the bar, and supported by the support disposed at the inner wall of the depression of the second battery.

14. The battery module of claim 11, wherein the connector comprises:

a longitudinal bar;

a first connecting portion recessed on one side of the bar toward an inside of the bar and configured to support the protrusion of the first battery; and a second connecting portion recessed on another side of the bar toward rite inside of the bar and configured to support the protrusion of the second battery.

15. The battery module of claim 11, wherein the connector comprises:

a longitudinal bar;

a first connecting portion protruding from, one side of the bar and supported by the support; and a second connecting portion recessed on another side of the bar toward an inside of the bar and configured to support the protrusion of the first battery.

16. The battery module of claim 15, wherein the second connecting portion comprises:

a recess into which the protrusion of the first battery is inserted; and a supporter disposed on an inner wall of the recess, and configured to support the protrusion of the first battery.

17. The battery module of claim 16, wherein the second connecting portion further comprises:

an elastic element disposed inside of the recess and connected to the protrusion of the first battery.

* * * * *